Patented Feb. 15, 1949

2,461,651

UNITED STATES PATENT OFFICE 2,461,651

METHOD OF TREATING SEA ANIMAL PRODUCTS

Erling Mathiesen, Stavanger, Norway, assignor to Hermetikkindustriens Laboratorium, Stavanger, Norway No Drawing. Application January 7, 1946, Serial No. 639,700

In Norway January 19, 1945

1 Claim. (Cl. 99—188)

The present invention relates to a method of improving canned sea animal products by treatment to enhance the seasoning effect in canned storage.

When cans of sea animal products are opened in a short time after sterilizing they frequently have a somewhat luscious smell and taste, the so-called 'steam smell" and 'steam taste." During storage of the canned products from fourteen days to a month such smell and taste generally disappear.

During further storage of six months to a year some canned sea animal products, as for instance canned brisling sardines, exhibit certain chemical changes of final characteristic flavor and taste. Also the appearance and consistency are somewhat changed. All and each of the said changes which give the canned products their characteristic good qualities, are summed up under the term seasoning. This seasoning is due to pure chemical causes, all enzymatic and microbal activity having been excluded by the strong heat treatment which the product has been subjected to during the sterilization.

As mentioned it is only some canned sea animal products which are subject to such seasoning effect. The present invention has as its objects to accelerate the progress of the normal seasoning process in such products, as for instance canned brisling sardines which otherwise season in the course of longer storage, and to cause such seasoning effect to take place in other products such as canned herring sardines and canned kippers, which normally do not have such, so that the products immediately after packing will appear in seasoned condition and have no steam smell and steam taste, and the corrosion effect upon the packing material is reduced, whereby the quality of the product is maintained.

The improvement of the quality is obtained by adding to the products during the preparation, for instance during or in connection with brining the raw material with brine, during smoking or after packing in cans, small quantities of reducing agents, usually after the pH-value of the products have been adjusted by means of acids to the value which is the most favorable for the progress of the seasoning reactions, usually about a pH of 6.0, while maintaining the taste character of the products. As reducing agents the following may be used: Metallic salts or salts of ammonia, or primary, secondary or tertiary aliphatic amines such as $NaH_2PO_2$, $Na_2S_2O_3$, $(NH_4)_2SO_3$, $KHSO_3$, $(CH_3HN_3)_2S$, $(CH_3)_4NHSO_3$, and organic reducing agents such as ascorbine acids. Gaseous reducing agents such as $SO_2$ may be used.

One may add either only one of the reducing agents or more of them in mixture. The quantities of the added reducing agents should be between 0.010 and 0.400 g. per 100 g. of the canned product.

As acid addition most inorganic acids and/or organic acids may be used. Also sour reacting salts may be used. The acid addition should correspond to 0.5–5 ml. 2N acid per 100 g. goods.

Examples 1. 100 kg. small herrings are brined 5 minutes in a brine containing 15 g./100 g. NaCl
1.5 g./100 g. $KHSO_3$ After the brining the small herrings are treaded, smoked and packed as sardines according to known methods.

2. To sardines of small herrings brined, treaded, smoked and packed in cans in the ordinary way, prior to closure and addition of oil or the like, the following solution is added in a quantity of 2 ml. per 100 g. fish.

5 g./100 ml. $K_2SO_3$
0.005 g./ml. HCl

3. Sardines of small herrings brined and treaded in the usual way are in connection with smoking or thereafter subjected to gaseous $SO_2$ in such concentrations and for length of time that the fish absorbs between 0.01 and 0.4 g., preferably about 0.05 g. $SO_2$ per 100 g. fish.

I claim:

The method of accelerating the natural seasoning of canned fish comprising adding to the fish prior to canning a small quantity of a reducing agent, sealing the fish into cans and thermally sterilizing the fish in the cans after sealing.

ERLING MATHIESEN.

REFERENCES CITED

The following references are of record in the file of this patent:

UNITED STATES PATENTS

| Number | Name | Date |
|---|---|---|
| 37,137 | McCall | Dec. 9, 1862 |
| 1,172,076 | Usric | Feb. 15, 1916 |
| 2,027,270 | Fellers | Jan. 7, 1936 |
| 2,381,019 | Webb | Aug. 7, 1945 |

FOREIGN PATENTS

| Number | Country | Date |
|---|---|---|
| 8,775 | Great Britain | 1913 |